United States Patent
Izumi et al.

(10) Patent No.: US 8,849,455 B2
(45) Date of Patent: Sep. 30, 2014

(54) ROBOT SYSTEM AND ROBOT CONTROL APPARATUS

(75) Inventors: Tetsuro Izumi, Fukuoka (JP); Tomohiro Matsuo, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 474 days.

(21) Appl. No.: 13/333,858

(22) Filed: Dec. 21, 2011

(65) Prior Publication Data

US 2012/0215353 A1 Aug. 23, 2012

(30) Foreign Application Priority Data

Feb. 23, 2011 (JP) ................. 2011-037454

(51) Int. Cl.
*G05B 19/18* (2006.01)
(52) U.S. Cl.
USPC ........... 700/254; 700/245; 901/28; 901/23; 901/9; 901/15; 901/19; 901/46; 74/490.03; 74/490.01; 74/490.02
(58) Field of Classification Search
USPC ........... 700/254, 245, 250, 258, 302; 901/28, 901/23, 9, 19, 46; 74/490.03, 490.01, 74/490.02; 310/68 B
See application file for complete search history.

(56) References Cited

U.S. PATENT DOCUMENTS

| | | | |
|---|---|---|---|
| 4,608,651 A | | 8/1986 | Murakami et al. |
| 5,442,270 A | * | 8/1995 | Tetsuaki ............... 318/568.22 |
| 5,455,497 A | * | 10/1995 | Hirose et al. ............. 318/568.12 |
| 5,459,925 A | * | 10/1995 | Akeel et al. .................. 29/893.2 |
| 5,829,307 A | * | 11/1998 | Harima et al. ............. 74/490.02 |
| 6,258,007 B1 | | 7/2001 | Kristjansson |
| 8,291,775 B2 | * | 10/2012 | Nagasaka et al. ......... 73/862.338 |
| 8,473,103 B2 | * | 6/2013 | Tsai et al. ..................... 700/254 |
| 2004/0255711 A1 | * | 12/2004 | Takenaka et al. .......... 74/490.01 |
| 2004/0261561 A1 | * | 12/2004 | Takenaka et al. .......... 74/490.01 |
| 2007/0164695 A1 | * | 7/2007 | Hagihara ................. 318/568.11 |
| 2009/0146650 A1 | | 6/2009 | Hatanaka et al. |
| 2010/0191374 A1 | * | 7/2010 | Tsai et al. ..................... 700/258 |
| 2011/0017003 A1 | | 1/2011 | Taniguchi |
| 2012/0210816 A1 | * | 8/2012 | Izumi ......................... 74/490.03 |

FOREIGN PATENT DOCUMENTS

| | | |
|---|---|---|
| JP | 59-079312 | 5/1984 |
| JP | 07-27410 | 4/1985 |
| JP | 61-153702 | 7/1986 |
| JP | 08-150580 | 6/1996 |
| JP | 2003-291082 | 10/2003 |
| JP | 2004-154879 | 6/2004 |
| JP | 2007-185743 | 7/2007 |
| JP | 2010-269412 | 12/2010 |
| JP | 2012-171072 | 9/2012 |

OTHER PUBLICATIONS

Extended European Search Report for corresponding EP Application No. 11195730.4-1239, May 22, 2012.

(Continued)

*Primary Examiner* — Ronnie Mancho
(74) *Attorney, Agent, or Firm* — Mori & Ward, LLP

(57) ABSTRACT

A robot system according to embodiments includes a position command generating unit that corrects a position command of a motor based on a rotation angle of the motor, which drives a link of a robot via a speed reducer, and a rotation angle of an output shaft of the speed reducer.

10 Claims, 6 Drawing Sheets

(56) References Cited

OTHER PUBLICATIONS

Juan Fernando Peza Solis et al., Modeling and Tip Position Control of a Flexible Link Robot, Computacion y Sistemas, 2009, pp. 421-435, vol. 12, No. 4, XP002675738, ISSN 1405-5546.

Japanese Office Action for corresponding JP Application No. 2011-037454, Apr. 23, 2013.
Japanese Decision of a Patent Grant for corresponding JP Application No. 2011-037454, 08-20-3013.

* cited by examiner

ROBOT SYSTEM AND ROBOT CONTROL APPARATUS

CROSS-REFERENCE TO RELATED APPLICATION

This application is based upon and claims the benefit of priority of the prior Japanese Patent Application No. 2011-37454, filed on Feb. 23, 2011, the entire contents of which are incorporated herein by reference.

FIELD

The embodiments discussed herein are directed to a robot system and a robot control apparatus.

BACKGROUND

There has been known a robot control apparatus that controls a robot in which a plurality of links is connected by joints. The robot control apparatus controls a motor provided at a joint portion of the robot and transmits power of the motor to a link via a speed reducer.

There is torsion in the speed reducer. Therefore, a robot control apparatus is proposed that improves a positioning accuracy by compensating for the torsion of the speed reducer. For example, the specification of U.S. Patent Application Publication No. 2010/0191374 proposes a robot control apparatus that compensates for torsion of a speed reducer by correcting a position command based on a difference between the output of an encoder provided on the output shaft side of the speed reducer and a predetermined position command.

However, in the above-described conventional robot control apparatus, an element of control delay is present between the output of the encoder and the position command, so that the position command needs to be corrected by performing adjustment according to the control delay. The control delay time changes depending on the responsiveness of a robot. Therefore, the delay time needs to be set according to the responsiveness of a robot, so that if the accuracy of a setting value is low, positioning cannot be performed with a high accuracy.

SUMMARY

A robot system according to an aspect of embodiments includes a robot and a robot control apparatus. Adjacent links are connected via a joint in the robot and the robot includes a motor and a speed reducer, which transmits a driving force of the motor to the link, in the joint. The robot control apparatus controls the robot by driving the motor. The robot includes a first detecting unit that detects a rotation angle of the motor and a second detecting unit that detects a rotation angle of an output shaft of the speed reducer. The robot control apparatus includes a control unit that corrects a position command of the motor based on the rotation angle of the motor detected by the first detecting unit and the rotation angle of the output shaft of the speed reducer detected by the second detecting unit.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, some embodiments of a robot system disclosed in the present application will be described in detail based on the drawings. The present invention is not limited to these embodiments.

First Embodiment

The robot system according to the first embodiment includes a robot and a robot control apparatus. Adjacent links are connected to each other via a joint in the robot and the robot control apparatus controls the robot by driving the joint. A multi-joint robot is explained as an example of the robot, however, it is sufficient that the robot is a robot including at least one joint. As the links connected via the joint, a base, a swivel head, and an arm are exemplified, however, the links are not limited thereto.

Figure 1:
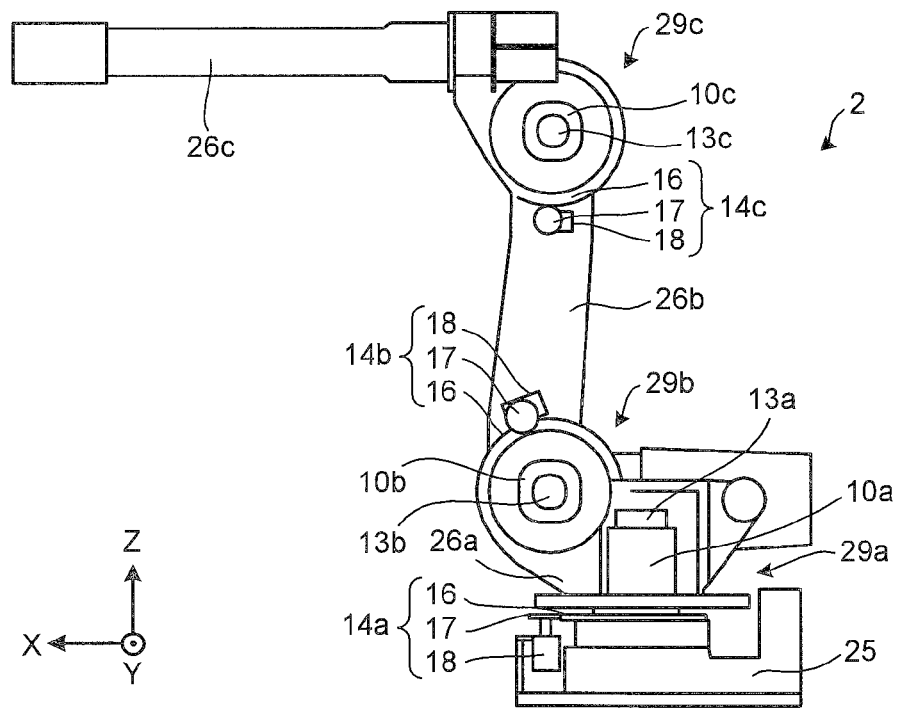
FIG. 1 is a schematic side view of a robot according to a first embodiment.

First, the configuration of the robot according to the first embodiment is explained. FIG. 1 is a schematic side view of the robot according to the first embodiment and FIG. 2 is a schematic front view of the robot according to the present embodiment.

Figure 2:
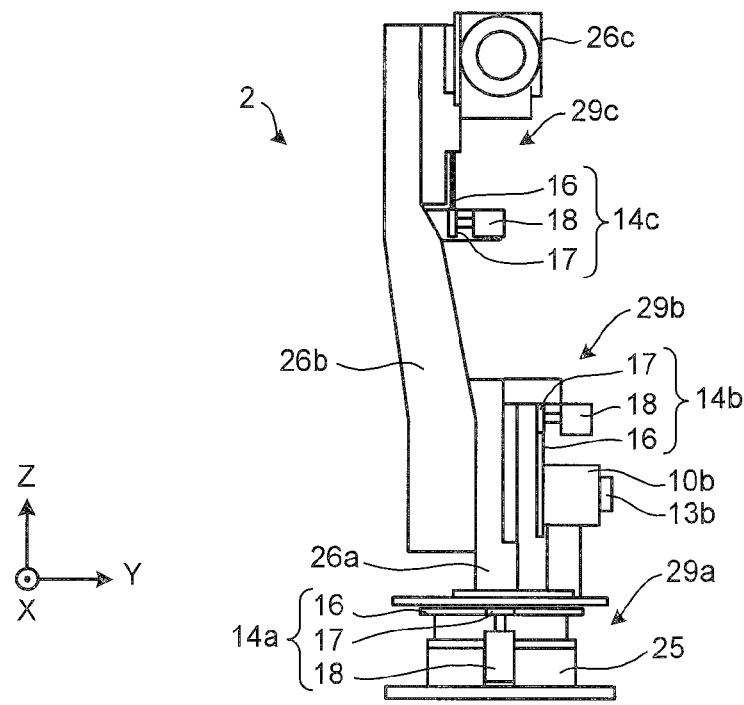
FIG. 2 is a schematic front view of the robot according to the first embodiment.

As shown in FIG. 1 and FIG. 2, a robot 2 is a multi-joint robot that includes a base 25, a swivel head 26a, a lower arm 26b, an upper arm 26c, and joints 29a to 29c. The joint 29a rotatably connects the swivel head 26a to the base 25. The joint 29b rotatably connects the lower arm 26b to the swivel head 26a. The joint 29c rotatably connects the upper arm 26c to the lower arm 26b. In the followings, each of the joints 29a to 29c is generically referred to as a joint 29 and the swivel head 26a, the lower arm 26b, and the upper arm 26c are generically referred to as a link 26 in some cases for convenience' sake of explanation.

The base 25 is fixed to a fixed surface, such as a floor and a ceiling, with not-shown anchor bolts. The base 25, the swivel head 26a, the lower arm 26b, and the upper arm 26c are, for example, structure support members made of a metal casting or the like and are arranged in order from the base 25 via the joints 29.

The joint 29a includes an actuator 10a, a first encoder 13a, and a second encoder 14a. In the similar manner, the joint 29b includes an actuator 10b, a first encoder 13b, and a second encoder 14b and the joint 29c includes an actuator 10c, a first encoder 13c, and a second encoder 14c. In the followings, the actuators 10a to 10c are generically referred to as an actuator 10 in some cases for convenience' sake of explanation. In the similar manner, the first encoders 13a to 13c (an example of a first detector) are generically referred to as a first encoder 13 and the second encoders 14a to 14c (an example of a second detector) are generically referred to as a second encoder 14 in some cases.

The first encoder 13 is an encoder that detects the rotation angle of the input shaft of the actuator 10. The second encoder 14 is an encoder that detects the rotation angle of the output shaft of the actuator 10. As described later, the actuator 10 includes a motor 11 (see FIG. 4) and a speed reducer 12 (see FIG. 4). The driving force of the motor 11 is transmitted to the link 26 via the speed reducer 12. The first encoder 13 detects the rotation angle of the motor 11 and the second encoder 14 detects the rotation angle of the output shaft of the speed reducer 12.

The second encoders 14a to 14c each include a rack gear 16, a pinion gear 17 meshing with the rack gear 16, and a detector 18. The detector 18 detects the rotation angle of the output shaft of the speed reducer 12 according to an amount of rotation of the pinion gear 17. In the second encoder 14, the relative position of the rack gear 16 and the pinion gear 17 changes with the rotation of the output shaft of the speed reducer 12.

Figure 3:
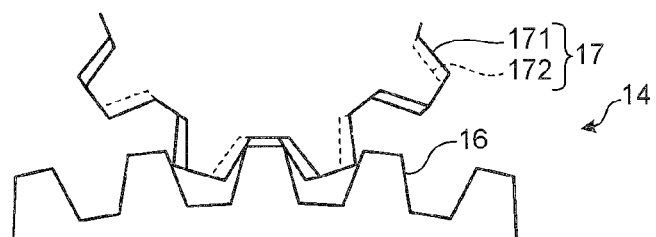
FIG. 3 is a diagram illustrating part of a configuration of a second encoder.

FIG. 3 is a diagram illustrating part of the configuration of the second encoder 14. As shown in FIG. 3, the pinion gear 17 includes a scissors gear mechanism, thereby eliminating backlash. In other words, a first gear 171 and a second gear 172 of the pinion gear 17 are biased in opposite directions from each other, whereby the pinion gear 17 meshes with the rack gear 16 in a state where backlash is eliminated. In this embodiment, an example in which the pinion gear 17 includes a scissors gear mechanism is explained, however, the rack gear 16 may include a scissors gear mechanism.

Figure 4:
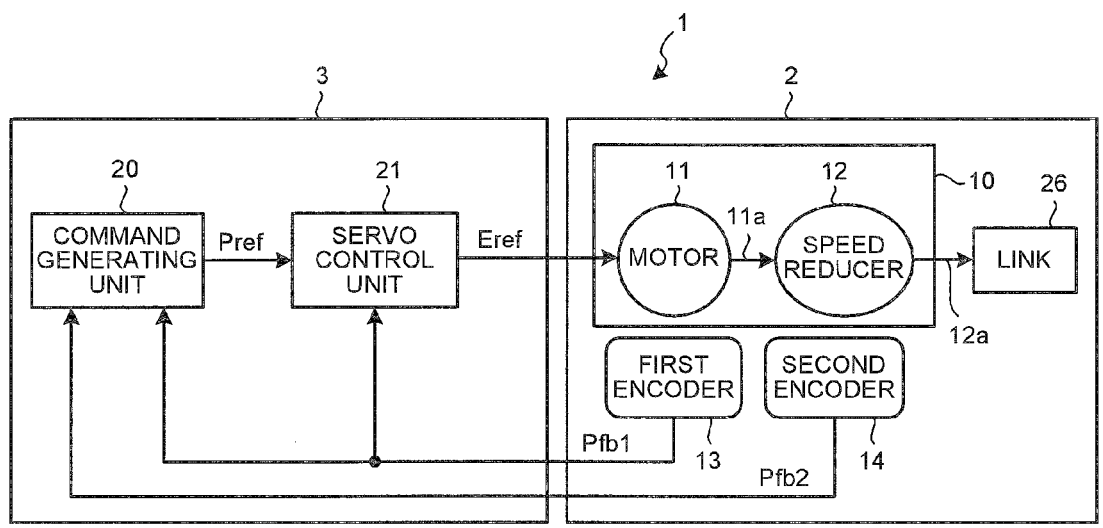
FIG. 4 is a diagram illustrating a configuration of a robot system according to the first embodiment.

Next, the configuration and the operation of the robot control apparatus that controls the robot 2 are explained. FIG. 4 is a diagram illustrating a configuration of a robot system 1 according to the first embodiment. The robot control apparatus performs similar control to any actuator 10, so that, in this embodiment, an example of driving one actuator 10 is explained. For example, in the case of controlling the actuator 10b, a robot control apparatus 3 controls the actuator 10b based on the information obtained from the first and second encoders 13b and 14b.

The robot control apparatus 3 drives the motor 11 provided in the joint of the robot 2. Consequently, the driving force of the motor 11 is transmitted to the link 26 by the speed reducer 12 and the link 26 is driven. As shown in FIG. 4, the robot control apparatus 3 includes a command generating unit 20 that outputs a position command Pref of the motor 11 and a servo control unit 21 that controls the motor 11 so that the rotation angle of the motor 11 matches the position command Pref. The position command Pref is a position command defining the rotation angle of the motor 11.

The command generating unit 20 outputs the position command Pref corrected based on rotation angles Pfb1 and Pfb2 obtained from the first and second encoders 13 and 14 to the servo control unit 21. The first encoder 13 detects the rotation angle of a rotation shaft 11a of the motor 11 as the rotation angle Pfb1 and the second encoder 14 detects the rotation angle of an output shaft 12a of the speed reducer 12 as the rotation angle Pfb2.

The servo control unit 21 obtains the position command Pref from the command generating unit 20 and obtains the rotation angle Pfb1 of the motor 11 from the first encoder 13. The servo control unit 21 calculates a current command Eref for matching the rotation angle Pfb1 of the motor 11 and the position command Pref based on the position command Pref and the rotation angle Pfb1 and outputs the current command Eref to the motor 11.

As above, the position command Pref output from the command generating unit 20 is corrected based on the rotation angle Pfb1 of the motor 11 and the rotation angle Pfb2 of the output shaft 12a of the speed reducer 12. Because an element of delay time of servo control is not included in the rotation angle Pfb1 of the motor 11 and the rotation angle Pfb2 of the output shaft 12a of the speed reducer 12, torsion of the speed reducer 12 can be compensated without performing the setting operation of compensating for the delay time of servo control.

Figure 5:
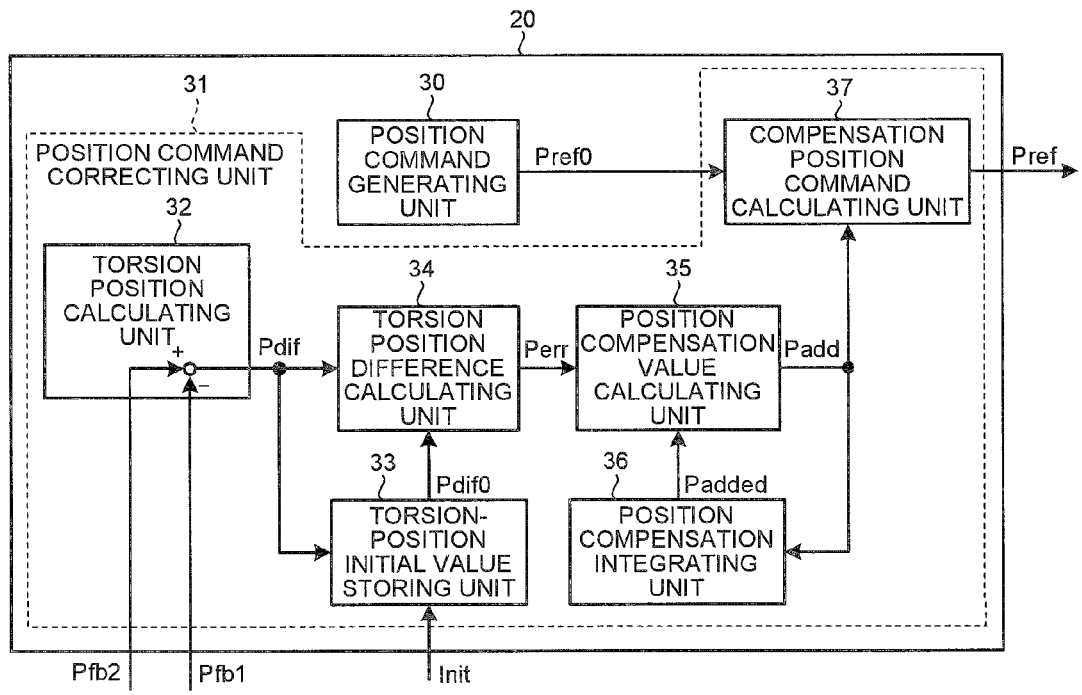
FIG. 5 is a diagram illustrating a configuration of a command generating unit according to the first embodiment.

FIG. 5 is a diagram illustrating the configuration of the command generating unit 20 according to the first embodiment. As shown in FIG. 5, the command generating unit 20 includes a position command generating unit 30 and a position command correcting unit 31.

The position command generating unit 30 generates a position command Pref0 of the motor 11 based on a predetermined command profile. Then, the position command generating unit 30 outputs the generated position command Pref0 to the position command correcting unit 31.

The command profile is generated, for example, as follows. First, an end effector position command (XYZ coordinates) is calculated so that the trajectory of a not-shown end effector attached to the tip end of the link of the robot 2 passes at predetermined acceleration and speed. The XYZ coordinates are coordinates of space in which the end effector as a control point operates. Then, the position command Pref0 (motor coordinates) of the motor 11 is generated by performing coordinate transformation on the end effector position command. The motor coordinates are coordinates of the rotation angle of the motor 11 that drives the link 26 of the robot 2. The command profile is formed by the position command Pref0 group generated according to the trajectory of the end effector.

The position command correcting unit 31 generates a position compensation value Padd that is a position command correction signal and corrects the position command Pref0 output from the position command generating unit 30 by the position compensation value Padd. Specifically, the position command correcting unit 31 includes a torsion position calculating unit 32, a torsion-position initial value storing unit 33, a torsion position difference calculating unit 34, a position compensation value calculating unit 35, a position compensation integrating unit 36, and a compensation position command calculating unit 37.

The torsion position calculating unit 32 generates a torsion position Pdif based on the rotation angle Pfb1 of the rotation shaft 11a and the rotation angle Pfb2 of the output shaft 12a of the speed reducer 12 and outputs the generated torsion position Pdif to the torsion position difference calculating unit 34. The torsion position Pdif is information indicating torsion of the speed reducer 12.

Specifically, the torsion position calculating unit 32 subtracts the rotation angle Pfb1 of the motor 11 from the rotation angle Pfb2 calculated from the rotation angle Pfb2 of the output shaft 12a of the speed reducer 12 based on the reduction ratio and sets this difference value as the torsion position Pdif. For example, when the reduction ratio of the speed reducer 12 is set to n, the torsion position calculating unit 32 subtracts the rotation angle Pfb1 of the motor 11 from the rotation angle Pfb2 multiplied by n and sets this difference value as the torsion position Pdif.

The torsion-position initial value storing unit 33 stores the torsion position Pdif output from the torsion position calculating unit 32 when an initialization signal Init is input, as a torsion position initial value Pdif0. For example, when the posture of the robot 2 is a basic posture, the initialization signal Init is input to the torsion-position initial value storing unit 33, and the torsion position Pdif output from the torsion position calculating unit 32 at that time is stored as the torsion position initial value Pdif0 in the torsion-position initial value storing unit 33.

The torsion position difference calculating unit 34 subtracts the torsion position initial value Pdif0 obtained from the torsion-position initial value storing unit 33 from the torsion position Pdif obtained from the torsion position calculating unit 32 to generate a torsion position difference Perr (=Pdif−Pdif0). The torsion position difference Perr is information indicating a displacement of the torsion position Pdif from the torsion position initial value Pdif0.

The position compensation value calculating unit 35 subtracts a position compensation integrated value Padded from the torsion position difference Perr to generate the position compensation value Padd. The position compensation value Padd is a position command correction signal and is output from the position compensation value calculating unit 35 to the compensation position command calculating unit 37. The position compensation integrated value Padded is information output from the position compensation integrating unit 36 and the position compensation integrating unit 36 integrates the position compensation value Padd output from the position compensation value calculating unit 35 to generate the position compensation integrated value Padded.

The compensation position command calculating unit 37 adds the position compensation value Padd obtained from the position compensation value calculating unit 35 to the position command Pref0 obtained from the position command generating unit 30 to generate a new position command Pref. Then, the compensation position command calculating unit 37 outputs the generated position command Pref to the servo control unit 21.

In this manner, in the robot system 1 according to the first embodiment, the command generating unit 20 corrects the position command Pref0 by adding the position compensation value Padd obtained from the difference between the rotation angle Pfb1 of the motor 11 and the rotation angle Pfb2 of the output shaft 12a of the speed reducer 12 to the position command Pref0 as the position command correction signal. Although an element of delay time of servo control is included between the position command Pref0 and the rotation angle Pfb1 of the motor 11, an element of delay time of servo control is not included in the rotation angle Pfb1 of the motor 11 and the rotation angle Pfb2 of the output shaft 12a of the speed reducer 12. Therefore, in the robot system 1 according to the first embodiment, the position error due to the torsion of the speed reducer 12 can be reduced without performing the setting operation of compensating for delay time of servo control.

Moreover, in the position compensation value calculating unit 35, because the position compensation integrated value Padded is subtracted from the torsion position difference Perr, the torsion position difference Perr once added as the position compensation value Padd is not added from the next time. Thus, the position command Pref can be accurately compensated according to the torsion position difference Perr.

In the above embodiment, the second encoder 14 is provided to three shafts, however, because each shaft is independently controlled, the second encoder 14 may be provided to only one or two shafts as appropriate.

A limiting unit, such a limiter and a filter, may be provided for avoiding abrupt fluctuation of the position command Pref due to correction. In this case, the limiting unit can be provided in a path between the torsion position difference calculating unit 34 and the compensation position command calculating unit 37.

For example, the position compensation value Padd obtained by the compensation position command calculating unit 37 can be limited to a limiting value by providing a limiter between the position compensation value calculating unit 35 and the compensation position command calculating unit 37. Moreover, for example, the rate of change of the position compensation value Padd obtained by the compensation position command calculating unit 37 can be limited by providing a filter between the position compensation value calculating unit 35 and the compensation position command calculating unit 37.

Moreover, an encoder is explained as an example of the first detecting unit that detects the rotation angle Pfb1 of the motor 11, however, it is sufficient that the first detecting unit can detect the rotation angle Pfb1 of the motor 11. For example, the first detecting unit may be an observer. In the similar manner, an encoder is explained as an example of the second detecting unit that detects the rotation angle Pfb2 of the output shaft 12a of the speed reducer 12, however, it is sufficient that the second detecting unit can detect the rotation angle Pfb2 of the output shaft 12a of the speed reducer 12. For example, the second detecting unit may be an observer.

Second Embodiment

Figure 6:
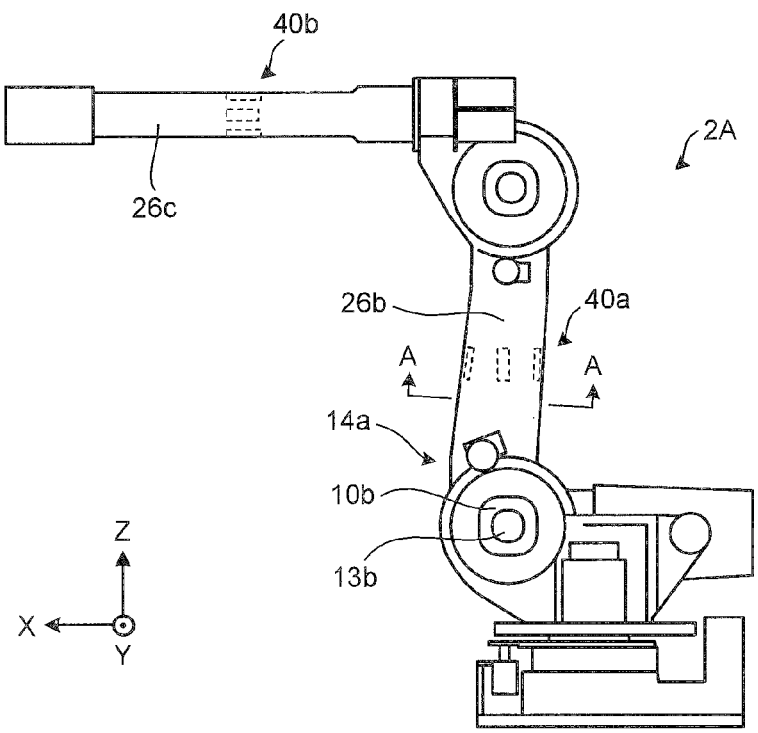
FIG. 6 is a schematic side view of a robot according to a second embodiment.
Figure 7:
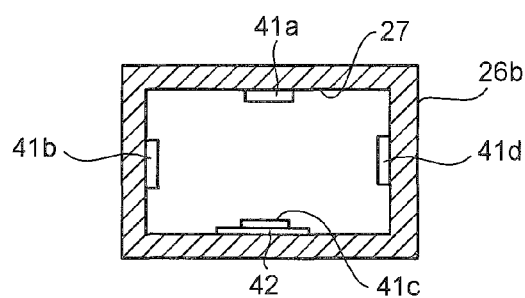
FIG. 7 is a schematic cross-sectional view taken along line A-A in FIG. 6.

Next, a robot system according to the second embodiment is explained. The robot system according to the second embodiment controls the actuator 10 by further compensating deflection of a link compared with the robot system according to the first embodiment. Consequently, even in the case where the link itself is deflected, for example, due to the own weight of the link, the force applied to an end effector at the link tip end, or the like, positioning of a robot can be accurately performed. FIG. 6 is a schematic side view of a robot according to the second embodiment and FIG. 7 is a schematic cross-sectional view taken along line A-A in FIG. 6. The configuration similar to the robot system 1 according to the first embodiment is explained by assigning the same reference numerals.

As shown in FIG. 6, in a robot 2A according to the second embodiment, in addition to the configuration of the robot 2 according to the first embodiment, a strain gauge unit 40a is attached to the lower arm 26b and a strain gauge unit 40b is attached to the upper arm 26c. Deflection of the lower arm 26b and the upper arm 26c can be accurately detected by attaching the strain gauge units 40a and 40b (an example of a third detector) to an area in which an amount of strain is large in the lower arm 26b and the upper arm 26c.

As shown in FIG. 7, the strain gauge unit 40a is attached to a rectangular inner wall 27 of the lower arm 26b. Specifically, each of strain gauges 41a to 41d configuring the strain gauge unit 40a is attached to a corresponding side of the inner wall 27 of the lower arm 26b, and a substrate 43 is attached to one side of the inner wall 27 of the lower arm 26b.

In the strain gauges 41a to 41d, a resistance value changes according to deflection of the lower arm 26b. The strain gauges 41a and 41c are strain gauges for detecting deflection in a first direction (vertical direction in FIG. 7) in deflection of the lower arm 26b and the strain gauges 41b and 41d are strain gauges for detecting deflection in a second direction (horizontal direction in FIG. 7), which is orthogonal to the first direction, in deflection of the lower arm 26b.

Figure 8:
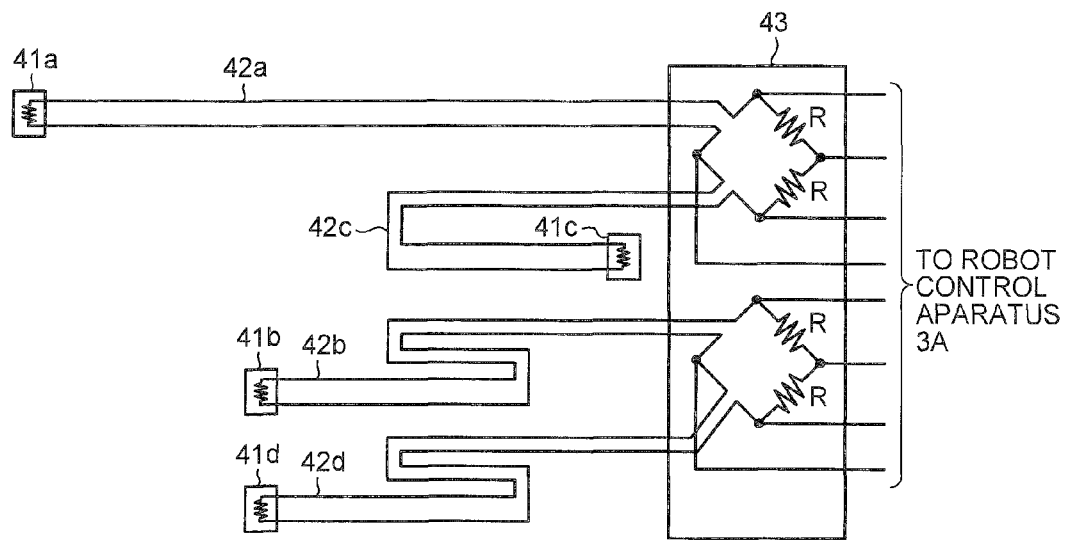
FIG. 8 is a diagram illustrating a wiring state of strain gauges.

As shown in FIG. 8, the strain gauges 41a and 41c are connected to the substrate 43 via wires 42a and 42c, and are bridged with two resistors R on the substrate 43. In the similar manner, the strain gauges 41b and 41d are connected to the substrate 43 via wires 42b and 42b and are bridged with two resistors R on the substrate 43. The wires 42a to 42d connecting the strain gauges 41a to 41d and the substrate 43 are formed to have the same length. Consequently, deflection of the lower arm 26b is accurately detected. A bridge connection structure with the resistors R may be provided for each of the strain gauges 41a to 41d.

In this manner, the strain gauge unit 40a detects deflection information in the first direction and the second direction of the lower arm 26b. Deflection of the lower arm 26b in the first direction can be compensated by adjusting the joint 29a and deflection of the lower arm 26b in the second direction can be compensated by adjusting the joint 29b. The strain gauge unit 40b has a configuration similar to the strain gauge unit 40a.

A robot control apparatus 3A detects deflection of the lower arm 26b and the upper arm 26c in each direction based on the deflection information output from the strain gauge units 40a and 40b and corrects control of the motor 11 by transforming the amount of the deflection into motor coordinate values. Consequently, deflection of the lower arm 26b and the upper arm 26c is compensated.

Deflection of the arms 26b and 26c may be digitalized on the substrate 43 of the strain gauge units 40a and 40b to output to the robot control apparatus 3A. In this case, the process can be simplified by daisy-chaining the strain gauge units 40a and 40b.

Figure 9:
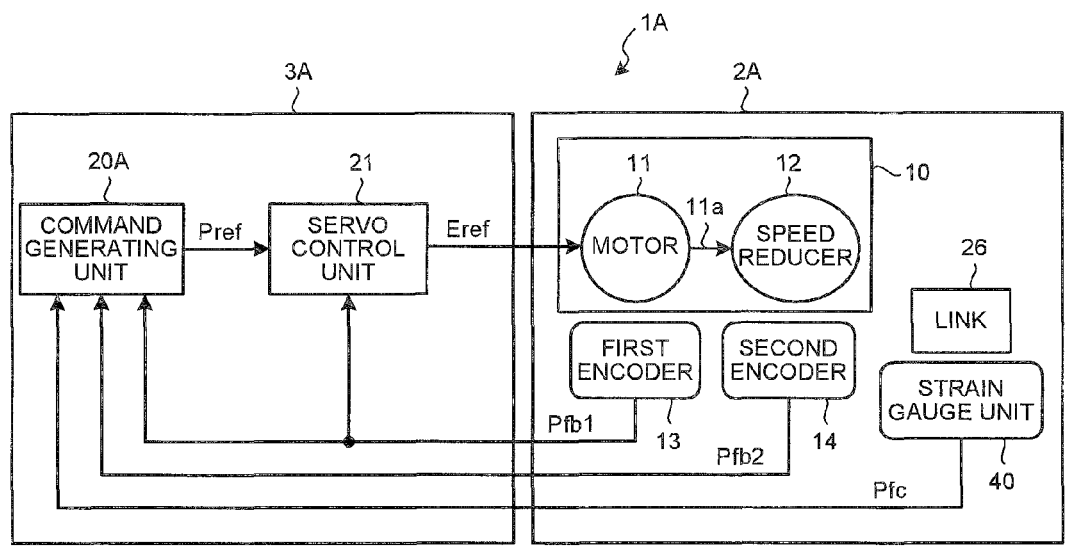
FIG. 9 is a diagram illustrating a configuration of a robot system according to the second embodiment.

For example, the strain gauge unit 40b is connected to the strain gauge unit 40a and the strain gauge unit 40a is connected to the robot control apparatus 3A (see FIG. 9). Then, the strain gauge unit 40b outputs a detection result of the strain gauge unit 40b to the strain gauge unit 40a by a serial signal. Moreover, the strain gauge unit 40a transmits a detection result of the strain gauge unit 40a to the robot control apparatus 3A (see FIG. 9) by a serial signal together with the detection result by the strain gauge unit 40b. In the followings, for the convenience' sake of explanation, the strain gauge units 40a and 40b are generically referred to as a strain gauge unit 40 in some cases.

Next, the configuration and the operation of the robot control apparatus that controls the robot 2A according to the second embodiment are explained. FIG. 9 is a diagram illustrating the configuration of a robot system 1A according to the second embodiment. In this embodiment, for easy understanding of the explanation, an example in which the robot control apparatus 3A according to the second embodiment controls one actuator 10 is explained. For example, in the case of controlling the actuator 10b, the robot control apparatus 3A controls the actuator 10b based on the information obtained from the first and second encoders 13b and 14b and the strain gauge unit 40a.

As described above, the robot 2A includes the strain gauge unit 40. The strain gauge unit 40 outputs detected deflection information Pfc to the robot control apparatus 3A.

The robot control apparatus 3A includes a command generating unit 20A and the servo control unit 21. The servo control unit 21 according to the second embodiment has a configuration similar to the servo control unit 21 according to the first embodiment.

Figure 10:
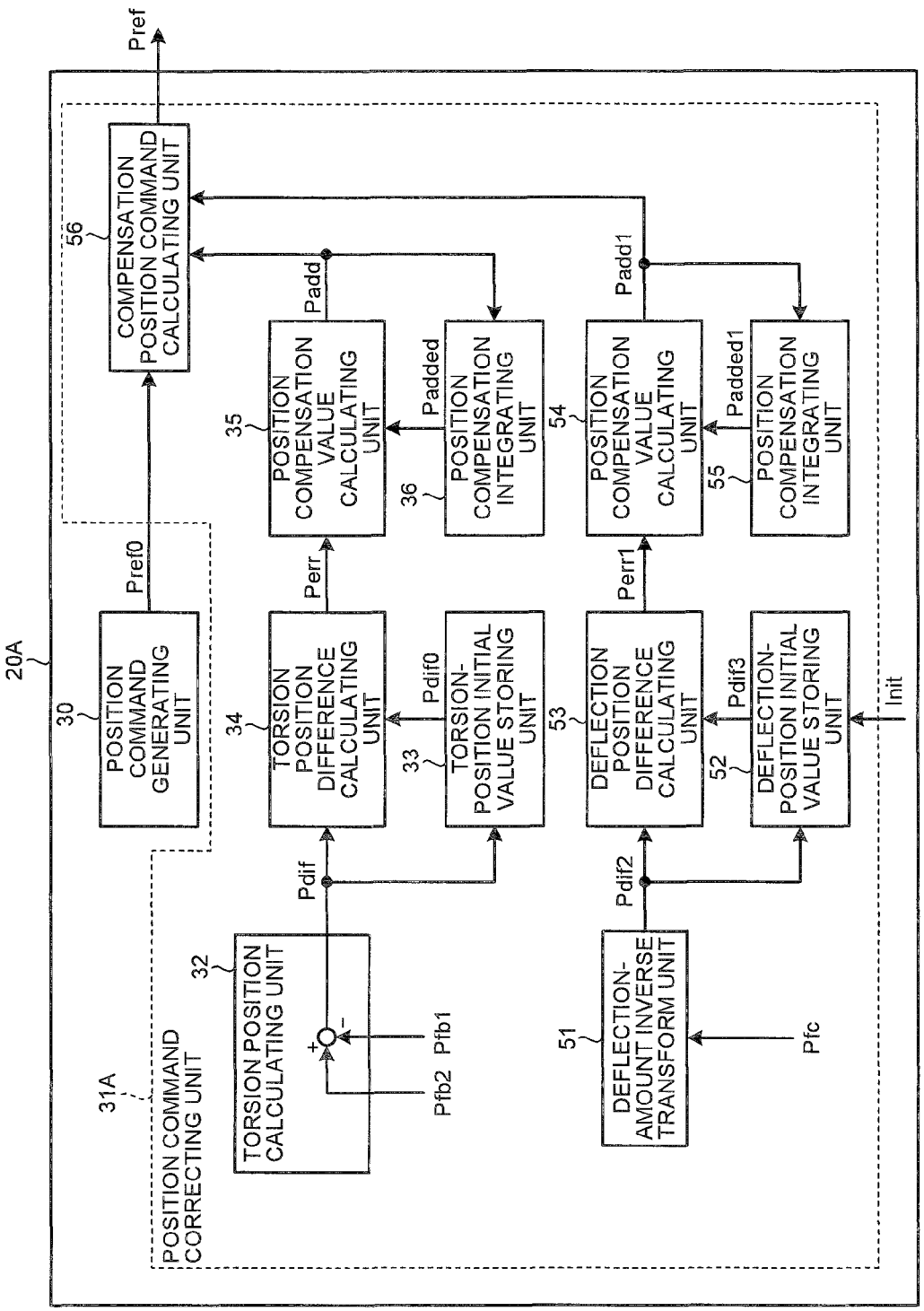
FIG. 10 is a diagram illustrating a configuration of a command generating unit according to the second embodiment.

The position command Pref output from the command generating unit 20A is corrected based on the deflection information Pfc in addition to the rotation angles Pfb1 and Pfb2. Therefore, torsion of the speed reducer 12 is compensated and moreover strain of the link 26 can be compensated. FIG. 10 is a diagram illustrating the configuration of the command generating unit 20A according to the second embodiment.

As shown in FIG. 10, the command generating unit 20A includes the position command generating unit 30 in the similar manner to the command generating unit 20 according to the first embodiment. Moreover, the command generating unit 20A includes a position command correcting unit 31A. The position command correcting unit 31A includes the torsion position calculating unit 32, the torsion-position initial value storing unit 33, the torsion position difference calculating unit 34, the position compensation value calculating unit 35, and the position compensation integrating unit 36 in the similar manner to the position command correcting unit 31 according to the first embodiment.

Furthermore, the position command correcting unit 31A includes a deflection-amount inverse transform unit 51, a deflection-position initial value storing unit 52, a deflection position difference calculating unit 53, a position compensation value calculating unit 54, a position compensation integrating unit 55, and a compensation position command calculating unit 56.

The deflection-amount inverse transform unit 51 calculates a deflection position Pdif2 according to the deflection information Pfc obtained from the strain gauge unit 40. Specifically, the deflection-amount inverse transform unit 51 detects an amount of deflection of the driving link 26 in a predetermined direction in the deflection information Pfc and performs coordinate transformation on the amount of deflection, thereby generating the deflection position Pdif2 (motor coordinates) of the link 26 driven by the motor 11. The motor coordinates are coordinates of the rotation angle of the motor 11 that drives the link 26 of the robot 2A.

For example, in the control to the actuator 10b that drives the lower arm 26b, the deflection-amount inverse transform unit 51 generates the deflection position Pdif2 of the lower arm 26b driven by the motor 11 by performing coordinate transformation on an amount of deflection of the lower arm 26b in the second direction in the deflection information Pfc obtained from the strain gauge unit 40a.

The deflection-position initial value storing unit 52 stores therein the deflection position Pdif2 output from the deflection-amount inverse transform unit 51 when an initialization signal Init is input, as a deflection position initial value Pdif3. For example, when the initialization signal Init is input to the deflection-position initial value storing unit 52 in a state where the posture of the robot 2A is a basic posture, the deflection position Pdif2 output from the deflection-amount inverse transform unit 51 is stored in the deflection-position initial value storing unit 52 as the deflection position initial value Pdif3.

The deflection position difference calculating unit 53 subtracts the deflection position initial value Pdif3 obtained from the deflection-position initial value storing unit 52 from the deflection position Pdif2 obtained from the deflection-amount inverse transform unit 51 to generate a deflection position difference Perr1 (=Pdif2−Pdif3). The deflection position difference Perr1 is information indicating a displacement of the deflection position Pdif2 from the deflection position initial value Pdif3.

The position compensation value calculating unit 54 subtracts a position compensation integrated value Padded1 from the deflection position difference Perr1 and outputs the subtracted value to the compensation position command calculating unit 56 as a position compensation value Padd1. The position compensation integrated value Padded1 is information output from the position compensation integrating unit 55 and the position compensation integrating unit 55 integrates the position compensation value Padd1 output from the position compensation value calculating unit 54 to generate the position compensation integrated value Padded1.

The compensation position command calculating unit 56 adds the position compensation value Padd obtained from the position compensation value calculating unit 35 and the position compensation value Padd1 obtained from the position compensation value calculating unit 54 to the position command Pref0 obtained from the position command generating unit 30 to generate a new position command Pref. Then, the compensation position command calculating unit 56 outputs the generated position command Pref to the servo control unit 21.

In this manner, in the robot system 1A according to the second embodiment, the command generating unit 20A includes the position compensation value Padd calculated based on the rotation angle Pfd1 and Pfb2 and the position compensation value Padd1 calculated based on the deflection amount Pdif2 output from the deflection-amount inverse transform unit 51, to be added to the position command Pref0. Therefore, in addition to reducing the position error due to the torsion of the speed reducer 12, the position error due to the deflection of the link 26 can further be reduced.

In this manner, because the position error due to the deflection of the link 26 can be reduced, for example, even when the link 26 is deflected due to the own weight of the link 26, a force applied to an end effector, or the like, positioning of the robot 2A can be accurately performed.

Moreover, in the position compensation value calculating unit 54, because the position compensation integrated value Padded1 is subtracted from the deflection position difference Perr1, the deflection position difference Perr1 once added as the position compensation value Padd1 is not added from the next time. Thus, the position command Pref can be accurately compensated according to the deflection position difference Perr1.

In the above, the strain gauge is explained as an example of the detector that detects deflection of the link 26, however, for example, it is possible to use a piezoelectric strain sensor as the detector that detects deflection of the link 26.

As above, in the robot systems 1 and 1A according to the first and second embodiments, the position compensation value Padd obtained from the rotation angle Pfb1 of the motor 11 and the rotation angle Pfb2 of the output shaft 12a of the speed reducer 12 are added to the position command Pref0. Therefore, the position error due to the torsion of the speed reducer 12 can be reduced without performing the setting operation of compensating for delay time of servo control, so that highly accurate positioning can be performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot system comprising:
a robot, in which adjacent links are connected via a joint, and a motor and a speed reducer, which transmits a driving force of the motor to the link, are provided in the joint; and
a robot control apparatus that controls the robot by driving the motor, wherein
the robot includes
a first detecting unit that detects a rotation angle of the motor, and
a second detecting unit that detects a rotation angle of an output shaft of the speed reducer, and
the robot control apparatus includes a command generating unit that corrects a position command of the motor based on a detection result by the first detecting unit and a detection result by the second detecting unit.

2. The robot system according to claim 1, wherein the command generating unit corrects the position command according to a difference between the detection result by the first detecting unit and the detection result by the second detecting unit.

3. The robot system according to claim 1, wherein
the second detecting unit includes
a rack gear,
a pinion gear that meshes with the rack gear and changes a relative position with respect to the rack gear along with a rotation of the output shaft of the speed reducer, and
a detector that detects a rotation position of the output shaft of the speed reducer according to an amount of rotation of the pinion gear, and
the rack gear or the pinion gear is a scissors gear.

4. The robot system according to claim 2, wherein
the second detecting unit includes
a rack gear,
a pinion gear that meshes with the rack gear and changes a relative position with respect to the rack gear along with a rotation of the output shaft of the speed reducer, and
a detector that detects a rotation position of the output shaft of the speed reducer according to an amount of rotation of the pinion gear, and
the rack gear or the pinion gear is a scissors gear.

5. The robot system according to claim 1, further comprising a third detecting unit that detects a deflection of the link, wherein
the command generating unit corrects the position command based on a detection result by the third detecting unit in addition to the detection result by the first detecting unit and the detection result by the second detecting unit.

6. The robot system according to claim 2, further comprising a third detecting unit that detects a deflection of the link, wherein
the command generating unit corrects the position command based on a detection result by the third detecting unit in addition to the detection result by the first detecting unit and the detection result by the second detecting unit.

7. The robot system according to claim 3, further comprising a third detecting unit that detects a deflection of the link, wherein
the command generating unit corrects the position command based on a detection result by the third detecting unit in addition to the detection result by the first detecting unit and the detection result by the second detecting unit.

8. The robot system according to claim 4, further comprising a third detecting unit that detects a deflection of the link, wherein
the command generating unit corrects the position command based on a detection result by the third detecting unit in addition to the detection result by the first detecting unit and the detection result by the second detecting unit.

9. A robot control apparatus comprising:
a position command generating unit that generates a position command defining a position of a robot including a plurality of links; and a position command correcting unit that corrects a position command of the motor based on a rotation angle of the motor, which drives the link of the robot via a speed reducer, and a rotation angle of an output shaft of the speed reducer.

10. A robot system comprising:
a robot, in which adjacent links are connected via a joint, and a driving means and a speed reducing means for transmitting a driving force of the driving means to the links are provided in the joint; and
a robot control apparatus that controls the robot by driving the driving means, wherein
the robot includes
   a first detecting means for detecting a rotation angle of the driving means, and
   a second detecting means for detecting a rotation angle of an output of the speed reducing means, and
the robot control apparatus includes a command generating means for correcting a position command of the driving means based on a detection result by the first detecting means and a detection result by the second detecting means.

* * * * *